(No Model.)

C. EIBEE.
BELT COUPLING.

No. 275,896. Patented Apr. 17, 1883.

WITNESSES:
Theo. G. Hoster
C. Sedgwick

INVENTOR:
C. Eibee
BY Munn & Co.
ATTORNEYS.

UNITED STATES PATENT OFFICE.

CARL EIBEE, OF BROOKLYN, NEW YORK.

BELT-COUPLING.

SPECIFICATION forming part of Letters Patent No. 275,896, dated April 17, 1883.

Application filed January 25, 1883. (No model.)

*To all whom it may concern:*

Be it known that I, CARL EIBEE, of Brooklyn, in the county of Kings and State of New York, have invented a new and Improved Belt-Coupling, of which the following is a full, clear, and exact description.

The object of my invention is to provide a new and improved device for uniting the ends of driving-belts.

Reference is to be had to the accompanying drawings, forming part of this specification, in which similar letters of reference indicate corresponding parts in all the figures.

Figure 1:
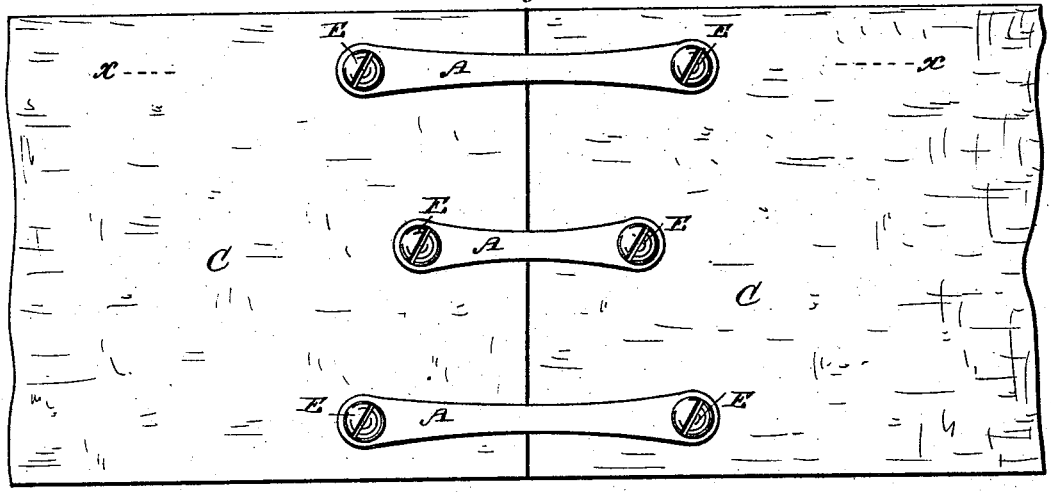
Figure 2:
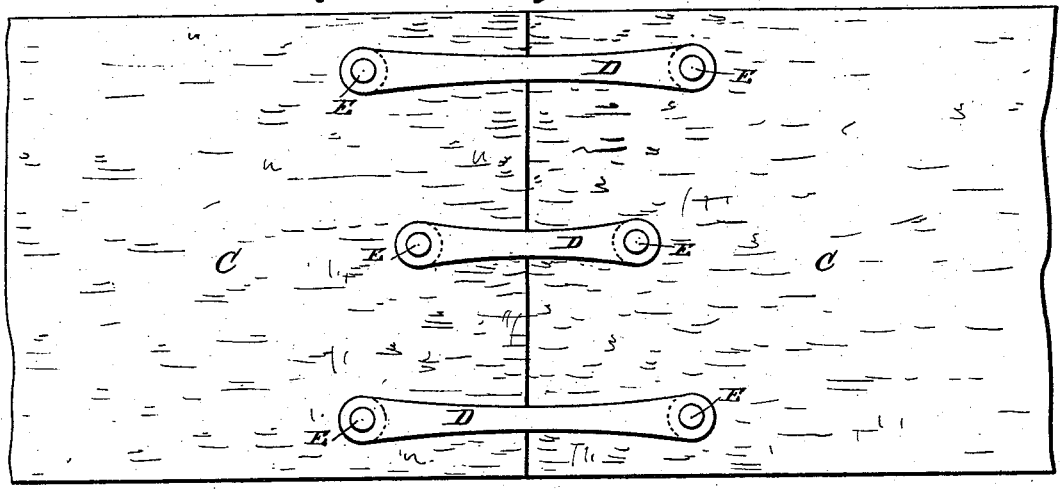
Figure 3:
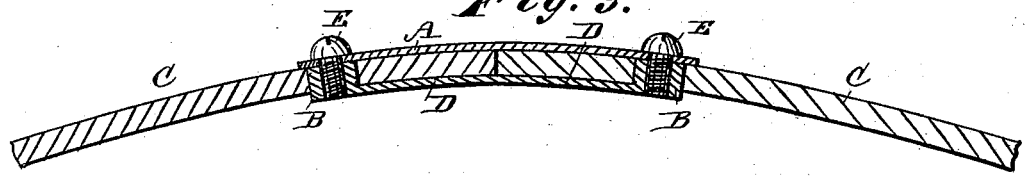

Figure 1 is a plan view of my improved belt-coupling, showing it on the upper or outer side of the belt. Fig. 2 is a like view, showing it on the inner or under side of the belt. Fig. 3 is a longitudinal sectional elevation of the same on the line $x$ $x$, Fig. 1.

A metal strip, D, is provided at each end with a socket, B, having a central screw-threaded aperture, the height of which socket from the upper surface of the strip is equal to the thickness of the belt C. The said strip is placed against the under surface of the abutting ends of the belt, and the sockets are passed through apertures a short distance from the end edges of the belt, so that the upper ends of the sockets will be flush with the upper or outer surface of the belt, as shown in Fig. 3. A metal strip of the same length as the strip D is placed on the upper or outer surface of the belt, so that the end apertures in the said strip D will be directly over the openings in the sockets B. Screws E are passed through the apertures in the ends of the strip A into the sockets B in such a manner that their heads will be on the outer surface of the belt, and thus unite the strips A and D, and hold the ends of the belt together. By this construction the fiber of the belt is not compressed, but retains its naturally pliable and flexible condition. This is due to the fact that the sockets B B extend through the belt and support the top plate, as shown in Fig. 3 of the drawings. The fastenings or couplings are made of different lengths, so that the several apertures in the belt will not be on one transverse line, as otherwise the belt would be weakened too much and would be apt to be ruptured. Any number of fastenings can be used, according to the width and strength of the belt. As the fastenings are rigid and stiff, the belt will not lie closely against the pulleys at the united ends; but the parts directly beyond the fastening will be pressed very powerfully against the pulley, and the friction will thus be increased.

My improved belt fastening or coupling will not tear the belt, but strengthen the same. If the ends of the belt are to be disconnected, the screws at the corresponding ends of the fastenings are removed, and the upper strips, A, are swung to one side, so as to clear that end of the belt that is to be removed from the fastenings, whereupon the said end of the belt is pressed upward to withdraw the sockets B from the apertures in the said end of the belt.

By means of my improved belt-coupling, the ends of the belt-coupling can be connected or disconnected very easily and rapidly.

For very thin belts the strip with the sockets is to be reversed and placed against the outer surface of the belt, and is held in place by screws simply passed through the belt and provided with heads, the strips A being dispensed with.

I am aware that it is not new to form a belt-coupling of pairs of screw-clamped plates, one plate in each pair being opposite to the other and on opposite sides of the belt, and in some instances the lower plate being let into the belt; but

What I claim as new and of my invention is—

In a metallic belt-coupling, the combination, with the screws E, of the bottom plate, D, having the vertical screw-threaded end sockets, B B, adapted to pass through the belt, be flush with its upper edge, and support the top plate, as shown and described.

CARL EIBEE.

Witnesses:
HARRY WILBER,
HENRY M. LEVERICH.